United States Patent [19]
Akeel et al.

[11] Patent Number: 4,892,992
[45] Date of Patent: Jan. 9, 1990

[54] INDUSTRIAL LASER ROBOT SYSTEM

[75] Inventors: Hadi A. Akeel; Stan H. McClosky, both of Rochester; Lupcho Najdovski, Sterling Heights, all of Mich.

[73] Assignee: GMF Robotics Corporation, Auburn Hills, Mich.

[21] Appl. No.: 266,679

[22] Filed: Nov. 3, 1988

[51] Int. Cl.⁴ .............................................. B23K 26/00
[52] U.S. Cl. ........................... 219/121.78; 219/121.84
[58] Field of Search ...................... 219/121.78, 121.79, 219/121.63, 121.64, 121.67, 121.72, 121.68, 121.69, 121.7, 121.71, 121.6, 121.85, 121.84

[56] References Cited

U.S. PATENT DOCUMENTS

| | | | |
|---|---|---|---|
| 3,986,767 | 10/1976 | Rexer et al. | 219/121.79 X |
| 4,650,952 | 3/1987 | Akeel | 219/121.78 X |
| 4,675,499 | 6/1987 | Nakai | 219/121.78 X |

Primary Examiner—C. L. Albritton
Attorney, Agent, or Firm—Brooks & Kushman

[57] ABSTRACT

A laser robot system including an offset robot. The system includes a laser beam generator for generating a laser beam. The robot includes a pedestal having a vertical first axis and a hollow base support on the pedestal for rotation about the first axis and for receiving the laser beam along the first axis. A single computer-based controller controls the laser beam generator, a drive system of the robot and an air source which is in fluid communication with the base of the robot. The air source pressurizes the laser beam path through the robot, thereby preventing contamination of the beam path. A hollow arm support in the form of a swing block is laterally supported on the base for rotation relative to the base about a horizontal second axis which intersects the first axis. A robot arm is elongated along a third axis which is obliquely angled to and intersects the second axis. The robot arm is laterally supported on the swing block for pivotal rotation therewith relative to the base about the second axis. First and second mirrors are supported within the base and the arm, respectively, so that a laser beam traveling along the first axis is deflected to then travel along the second axis and then deflected to travel along the third axis and through an optical focusing assembly on the arm. The first mirror is reversible so that the base can receive the laser beam from opposite directions.

37 Claims, 2 Drawing Sheets

INDUSTRIAL LASER ROBOT SYSTEM

TECHNICAL FIELD

This invention relates to laser robot systems and, in particular, to industrial laser robot systems having mirrors mounted within the moving parts of a robot of the system for automatically controlling the path of the laser beam as the robot moves.

BACKGROUND ART

Robot capabilities range from very simple repetitive point to point motions to extremely versatile movement that can be controlled in sequence by a computer as a part of a complete integrated manufacturing system. Robots have been used in many material processing applications including cutting, trimming and welding.

Laser applications can be divided into several general categories including the measurement of spatial parameters, material heating and/or removal, non-destructive probing of resonant phenomena, communications, optical processing, laser-induced chemical reactions and wepons.

The combination of a laser with a robot allows the laser to operate with a degree of freedom previously unknown. The combination of the two technologies, if successfully performed, is suitable for most laser applications, including material processing applications. The same laser can be used in processing many kinds of materials by controlling the speed and the power of the laser. The laser can cut metal, cut glass, trim plastic or weld aluminum. Because robots are typically controlled by a programmed computer, the same computer can be used to regulate the laser's power. Consequently, in a flexible manufacturing line, parts can be cut or welded one after the other simply by adjusting the power of the laser.

Lasers are currently in operation in both commerical and industrial environments. For example, many parts of an automobile are processed with lasers. Also, a large percentage of vision systems that measure depth are laser-based.

Another industrial use of the laser is laser-assisted machining wherein the laser beam is applied in front of a cutting tool to reduce tool wear and cutting forces. Such an application results in fewer tool changes, decreased total tool wear and tool cost, increased cutting speeds and increased amounts of materials that can be cut.

Two types of lasers are typically used in material processing applications, solid state and carbon dioxide lasers. The carbon dioxide lasers are relatively unlimited in power. The solid state lasers are limited in power and require more elaborate shielding than the carbon dioxide lasers.

Popular uses for metal-working lasers include seam, spot and fusion welding, cutting, drilling, surface hardening, metal marking, scarfing, deburring, trimming and heat treating. The advantages of laser processing are particularly evident in welding. Welding done with lasers often requires no additional work such as grinding. With traditional welding, welds must be reworked a large percentage of the time. Therefore, cost savings are an important aspect of laser welding.

Two methods have developed in order to link lasers with robots. One method is to move a part via a robot into the laser beam. The other way is to move the beam via the robot to the part. The latter method is effective if the part is too large to be moved easily or when contouring is necessary.

One method of moving the beam via the robot to the part incorporates two mirrors in each joint (i.e. optical joint) of a tubular linkage mechanism which is manipulated by the robot to direct the laser beam along the desired path. It has proven difficult to hold the mirrors in place very securely and precisely enough for the beam cannot be misdirected even a fraction of a degree as it proceeds along its path. Dynamics of the robot usually affect the mirror positions and must be taken into account in such a design.

A focusing lens positioned in such a mechanism concentrates the laser energy and directs it to a singular point with a high power density. Consequently, the robot must be very accurate to direct the beam to a precise area on a workpiece. A longer focal length lens can be used to compensate for robot inaccuracies. However, the resulting beam is focused over a larger area so that both power density and speed are lower.

Despite the above-noted problems in linking the laser with the robot, it is highly desirable to forge this linkage especially because the laser is an ever sharp tool having a non-contact method of operation. The use of the laser also eliminates tactile feedback and tool wear because the laser and the part do not touch each other.

Elimination of even one robot mirror from the total number of mirrors in a laser robot system is important for the following reasons: (1) significant cost savings can be realized due to the relatively high cost of the mirrors compared to other components of the system; (2) the efficiency of power transmission is increased since power losses of the collimated laser beam are almost entirely attributed to the absorption of energy which occurs at each mirror; (3) initial alignment of the beam delivery system is simplified with fewer mirrors to align, thereby minimizing the magnitude of the resultant alignment error which is practically achievable; and (4) system reliability is increased and a reduction in required maintenance is achieved with fewer mirrors to clean and maintain in alignment.

The U.S. Pat. No. to Plankenhorn 4,539,642 discloses a method of linking a robot with a laser including a laser arm which is manipulated by the robot. The laser arm is supported by the robot arm and is aligned to move in synchronization with the robot joints. The laser arm must be mounted to the robot arm in a precision synchronized fashion.

The U.S. Pat. No. to Akeel 4,650,952 discloses a robot laser system wherein the robot has a number of degrees of freedom constituted by two orthogonally related linear movements along intersecting longitudinal axes and two orthogonally related rotary joints having intersecting pivotal axes.

The U.S. Pat. No. to Nakashima et al 4,706,001 discloses an industrial robot having pressurized, airtight chambers in which electric motors are housed.

The U.S. Pat. No. to Monteith et al 4,695,701 discloses a laser robot system including a laser wrist.

The U.S. Pat. No. to Bisiach 4,677,274 discloses a robot laser system wherein the laser beam reaches the robot through a side opening therein whereafter it is axially directed by a pair of adjustable mirrors to a hollow head. Neither of these mirrors is mounted at the intersection of two pivotal axes.

The U.S. Pat. No. to Marinoni 4,698,483 discloses a robot laser system wherein the robot includes a base and a fork element supported vertically and rotatably by the base. An arm is articulated at its first end to the fork element about a substantially horizontal axis. A forearm is articulated to a second end of the arm about a substantially horizontal axis. A wrist assembly is mounted at the unarticulated end of the forearm, is rotatable about an axis parallel to the forearm and has an end portion which supports a lens for focusing the laser beam, unlike the above-noted Plankenhorn patent which discloses a laser beam path fully contained in a structure coupled to move in synchronism with the main robot structure. The Marinoni patent utilizes the robot structure for passage of the laser beam for segments of its laser path.

The U.S. Pat. No. to Rando et al 4,698,479 discloses the use of sealed, sliding telescoping tubes in a laser beam delivery system.

Japanese Patent Document Ser. No. 59-107785 discloses a laser robot system including a robot having a motorized multi-joint arm provided with reflecting mirrors at the ends of the arm parts.

Japanese Patent Document No. 59-223188 discloses a laser beam machine having a reflecting mirror provided in each joint portion of a manipulator.

DISCLOSURE OF THE INVENTION

An object of the present invention is to provide an industrial laser robot system having an offset robot arm configuration which allows a minimum number of mirrors to be supported directly by the robot joint bearings so that at least one of the mirrors is located at the intersection of two pivotal axes.

Another object of the present invention is to provide an industrial laser robot system having fewer component parts, including mirrors, for a given number of degrees of freedom to thereby reduce mechanism complexity, cost and weight, while increasing mechanism performance and reliability.

Yet still another object of the present invention is to provide an industrial laser robot system including a robot base in which a first reflective mirror is capable of being reversibly mounted so that a laser beam may enter the robot from either of two opposite directions without the need for additional reflecting mirrors.

A further object of the present invention is to provide an industrial laser robot system having a pressurized, airtight internal passage that fully contains the laser beam within the robot structure.

Another object is to provide an industrial laser robot system having a common, computer-based controller which controls a robot, a laser beam generator and an air source which pressurizes the laser beam path within the robot to prevent laser beam contamination.

In carrying out the above objects and other objects of the present invention, an industrial laser robot system constructed in accordance with the present invention includes a laser beam generator for generating a laser beam; a pedestal having a first axis and a hollow base supported on the pedestal for rotation about the first axis. A hollow arm support is laterally supported on the base for rotation relative to the base about a second axis. The first and second axes are obliquely angled to and intersect one another. A robot arm elongated along a third axis is laterally supported on the arm support for pivotal rotation therewith relative to the base about the second axis. A first mirror is supported within the base so that the reflective surface of the first mirror contains a first point of intersection of the first and second axes and is so inclined so that a laser beam entering the base along the first axis is deflected by the first mirror to travel along the second axis. A second mirror is supported by the arm support within the arm so that the reflective surface of the second mirror intersects the second axis at a second point of intersection and is so inclined to direct the laser beam along the third axis of the arm. The system further includes an optical focusing assembly mounted on the arm. A continuous unobstructed hollow passage extends along and surrounds the first axis to the first point of intersection and along the second axis to the second point of intersection and along the third axis to and through the optical focusing assembly. The pedestal is so disposed so that the base receives the laser beam from the laser beam generator for transmission along the hollow passage to the optical focusing assembly.

Further in carrying out the above objects and other objects of the present invention, an industrial laser robot system constructed in accordance with the present invention includes a laser beam generator for generating a laser beam; a hollow base; and a robot arm supported on the base for rotation relative to the base about a pivot axis and elongated along an arm axis. At least one arm mirror is supported within the arm so that the reflective surface of the at least one arm mirror contains a first point of intersection of the pivot and arm axes and is so inclined so that a laser beam traveling along the pivot axis is deflected by the at least one arm mirror to travel along the arm axis. An optical focusing assembly is included and has first and second ends, the first end being connected to the robot arm. A continuous unobstructed hollow passage extends along and surrounds the pivot axis in the base to the first point of intersection and along the arm axis to and through the optical focusing assembly. The base is so disposed so that the base receives the laser beam from the laser beam generator for transmission along the hollow passage and out of the focusing assembly at the second end of the focusing assembly. The invention is characterized by maintaining means for automatically maintaining a positive pressure within the acceptable range above atmospheric pressure in the hollow passage. The hollow passage is airtight. The positive pressure prevents contaminants from entering the hollow passage.

Preferably, the system further comprises a first mirror support mounted within the base for, in turn, supporting the first mirror within the base. The first mirror support is reversible to alternately allow the first mirror to receive the laser beam in opposite directions along the first axis.

Also, preferably, the base is generally cylindrical along the first axis and the arm support is laterally spaced from the corresponding cylindrical space defined by an extension of the base along the first axis during rotary movement of the arm support about the second axis.

The advantages accruing to this design are numerous. For example, a relatively small number of mirrors in such an industrial laser robot system is required and the offset robot arm configuration allows the mirrors to be directly supported by the robot joint bearings. The laser beam is protected by the robot body rather than by an independent vulnerable structure.

The advantages of the present invention will be readily appreciated as the same becomes better understood by the following detailed description when considered in connection with the accompanying drawings.

BEST MODE FOR CARRYING OUT THE INVENTION

Figure 1:
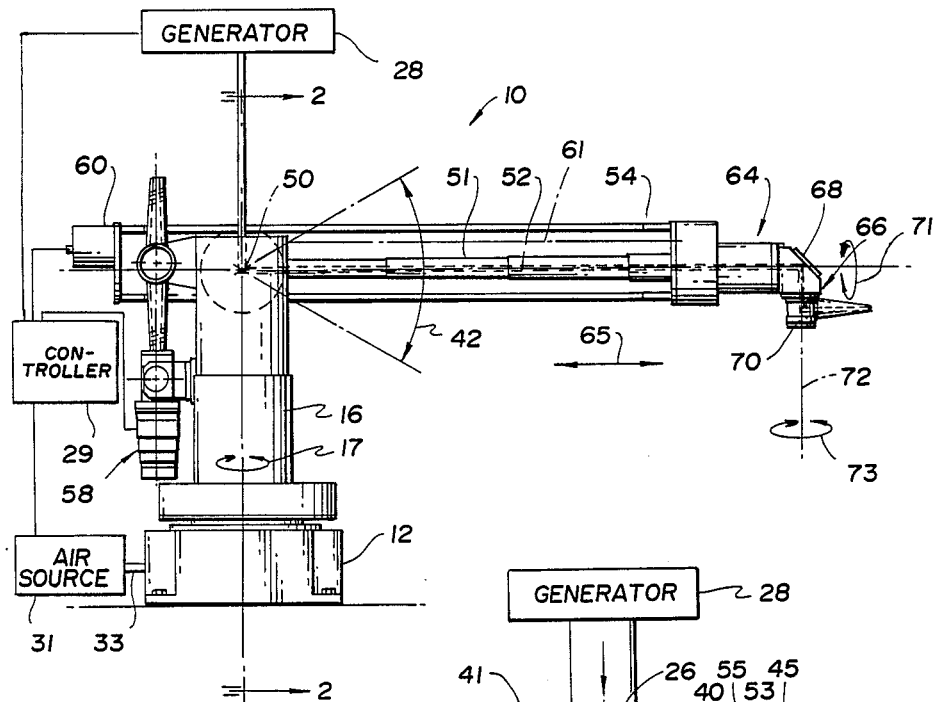
FIG. 1 is a side elevational view, partially broken away, illustrating a robot for use in the industrial laser robot system, constructed in accordance with the present invention.

Referring now to the drawings there is illustrated in FIG. 1 a first embodiment of a robot, generally indicated at 10 for use in an industrial laser robot system constructed in accordance with the present invention. The robot 10 may be used for laser welding and is integrated with a beam delivery system as will be disclosed in greater detail hereinbelow.

Generally, the robot 10 is of a spherical configuration thereby making the robot 10 relatively simple and having a relatively large workspace for its intended applications. Also, the robot 10 is upside-down mountable allowing for further flexibility for process requirements. For example, in an upright position there is flexibility for a laser beam to enter the robot 10 directly from either below the robot 10 or from the top of the robot 10 without the need for additional mirrors.

Figure 2:
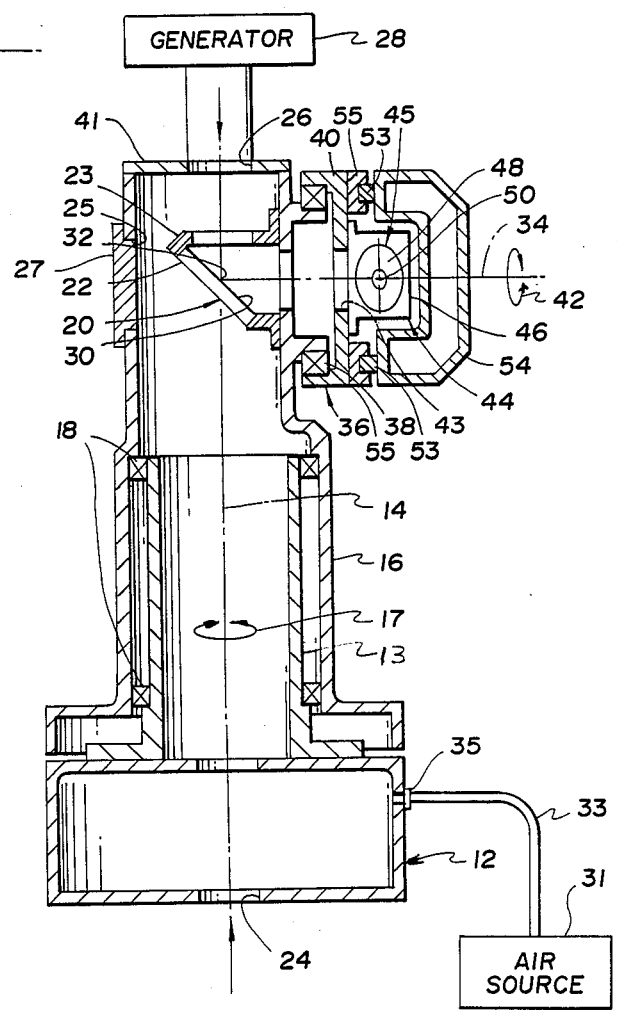
FIG. 2 is a sectional view, taken along lines 2—2 in FIG. 1 including a laser beam generator of the system of the present invention.

Referring now to FIG. 2 in combination with FIG. 1, the robot 10 includes a robot pedestal, generally indicated at 12, having a vertical first base axis 14. A hollow, generally cylindrical, air-tight base 16 is supported on a cylindrical part 13 of the pedestal 12 for rotation as indicated by arrows 17 about the first axis 14 by sealed bearings 18. While not illustrated, the base 16 is preferably driven by an AC servo motor through gear reducers or other speed reducing elements. Typically, anti-backlash features are adapted for the gears.

A first mirror block or beam bender, generally indicated at 20, includes a first mirror 22 and a first mirror support 23 for adjustably supporting the mirror 22 within the base 16. The mirror support 23 may be rotated 180 degrees from its position on the inner surface of the base 16 to accommodate a laser beam entering through either an opening 24 at the bottom of the pedestal 12 or a beam entering through an opening 26 at the top of the base 16. When either the opening 24 or opening 26 is used the other is usually covered to maintain the interior cavities of the robot 10 substantially air-tight. The mirror support 23 is accessible through an access opening 25 in the wall of the base 16. A sealing cover 27 seals the opening 25 after mirror support adjustment.

A laser beam generated by a laser beam generator 28 and emitted along the first axis 14 is reflected by the reflective surface 30 of the mirror 22 at a first point of intersection 32 to travel along a second axis 34 which is obliquely angled to and intersects the first axis 14.

A single controller 29 controls the robot 10, the generator 28 and an air source 31 which is in fluid communication with the base 16 of the robot 10 through a hose 33 and a fitting 35. The air source 31 provides clean, dry air-under a positive pressure sufficiently high enough above atmospheric pressure to compensate for any air leakage within the robot 10. In this way, contaminants are prevented from entering the laser beam path within the robot. Such contaminants typically create power loss and overheating.

A hollow arm support or arm support means, generally indicated at 36, is laterally supported on the base 16 for rotation relative to the base 16 about the second axis 34 by sealed bearings 38. The arm support 36 includes a swing block 40 which does not interfere with the space above a top surface 41 of the base 16 during rotary movement about the second axis 34 in the direction of arrows 42. The swing block 40 includes an aperture 43 to permit the laser beam to travel therethrough along the second axis 34.

A second mirror block or beam bender, generally indicated at 44, includes a second mirror, generally indicated at 45, and a second mirror support 46 for adjustably supporting the mirror 45. The mirror support 46 is fixedly mounted to the swing block 40 to rotate therewith about the second axis 34. The second mirror 45 is supported so that its reflective surface 48 intersects the second axis 34 at a second point of intersection 50. The mirror 46 is so inclined to direct the laser beam along a third axis 52, as shown in FIG. 1, of a robot arm 54.

The robot arm 54 is also slidably supported on the arm support 36 by linear slides 53 received within parallel spaced retainers 55 on the swing block 40. Consequently, the arm 54 is mounted for translational movement relative to the swing block 40 along the third axis 52 as indicated by arrows 65.

Rotation of the arm 54 and the arm support 36 about the horizontal axis 34 is preferably accomplished by a precision ballscrew-pivot mechanism, generally indicated at 58, which is secured to the base 16 to rotate therewith. The motors and gearing of the mechanism 58 are sized and controlled for inertia and gravity loads.

Preferably, a drive motor 60 is connected via a pully arrangement to a precision ball screw (only the axis of which is illustrated at 61 for simplicity) to linearly move the robot arm 54 along the third axis 52 in a translational fashion as indicated by arrows 65.

The laser robot system also includes an optical focusing assembly, generally indicated at 64, supported on the arm 54. The assembly 64 includes a two-axes wrist mechanism, generally indicated at 66, having a third mirror 68 adjustably mounted therein to reflect the laser beam from the third axis to a focusing mirror 70 also mounted thereon. The wrist mechanism 66 allows rotation about the third axis 52 in the direction of arrows 71 and about a fourth axis 72 in the direction of arrows 73.

Telescoping guide tubes 51 are provided for containing the laser beam within the arm 54. One end of the tubes 51 is sealingly connected to the mirror support 46 and the opposite end of the tubes 51 is sealingly connected to the focusing assembly 64. The guide tubes 51 are air-tight and pressurized from the air source 31 to prevent contamination of the laser beam therein.

Preferably, the wrist mechanism 66 is driven about the axes 52 and 72 by AC servo motors (not shown) within the assembly 64. Also, preferably, the servo motors drive the two axes of the wrist mechanism 66 through anti-backlash gearing.

Figure 3:
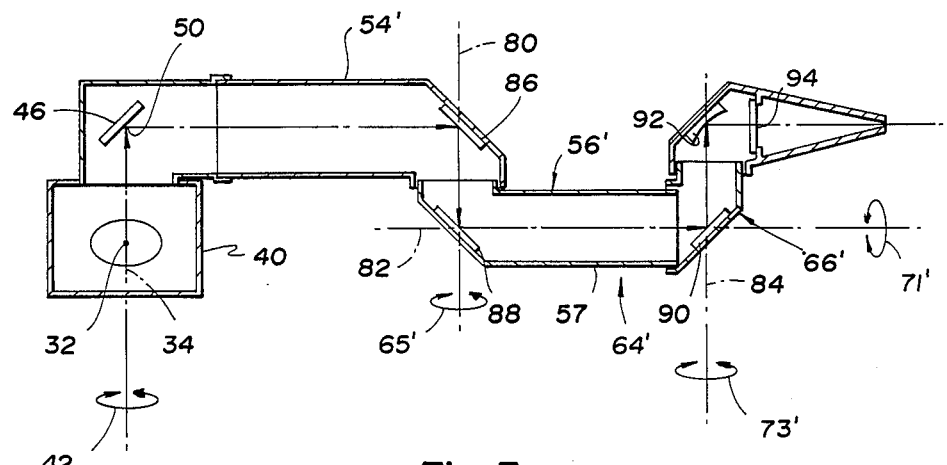
FIG. 3 is a schematic view of a second embodiment of a part of a robot for use in the system of the present invention, wherein the robot arm is fixed to the arm support mechanism and a different optical focusing assembly is utilized.

Referring now to FIG. 3, there is shown a second embodiment of the invention wherein a robot arm 54' is fixedly connected to the swing block 40 so that the arm 54' only rotates about the horizontal second axis 34 and does not move linearly relative to the swing block 40.

In the embodiment of FIG. 3, an optical focusing assembly 64' is provided for rotation about axis 80, 82 and 84 in the direction of arrows 65', 71' and 73', respectively. The focusing assembly 64' includes a forearm 57 mounted on the arm 54' and a wrist mechanism, generally indicated at 66', mounted on the forearm 57 and substantially the same as the wrist mechanism 66.

A flat mirror 86 is adjustably mounted at one end of the arm 54' and reflects the laser beam along the axis 80 to a flat mirror 88 adjustably mounted in the forearm 57. The mirror 88, in turn, reflects the laser beam along the axis 82 to a flat mirror 90 adjustably mounted in the wrist mechanism 66'. From the mirror 90 the laser beam is reflected along an axis 84 to a focusing mirror 92 also mounted in the wrist mechanism 66'. A transparent flat plate 94 sealingly mounted within the beam outlet portion of the wrist mechanism 68' reduces air leakage and protects the mirror 92. Each of the mirrors 86, 88, 90 and 92 rotates with its respective robot part.

While not shown, it is to be understood that the mirror blocks 20 and 44 may be water cooled and include temperature-sensing thermocouple wires. Also, cables including motor, power lines, encoder power and feedback lines, robot servo input-output lines to the wrist, water lines, air lines and electrical lines for thermocouples are provided.

The focusing mirror 92 may be replaced by a flat mirror if, in addition, the flat plate 94 is replaced by a focusing lens.

The advantages of the above laser robot system are numerous. For example, by providing the above desired offset robot arm configuration, a least one robot mirror can be eliminated with its attendant disadvantages. Also, the configuration allows the remaining mirrors to be supported directly by the robot joint bearings. The air source 31 provides the necessary pressurization to prevent contamination of the laser beam path.

While the best mode for carrying out the invention has herein been described in detail, those familiar with the art to which this invention relates will recognize various alternative designs and embodiments for practicing the present invention as defined by the following claims.

What is claimed is:

1. An industrial laser robot system comprising:
a laser beam generator for generating a laser beam;
a pedestal having a first axis;
a hollow base supported on said pedestal for rotation about said first axis;
hollow arm support means laterally supported on said base for rotation relative to the base about a second axis, said first and second axes being obliquely angled to and intersecting one another;
a robot arm elongated along a third axis and laterally supported on said arm support means for pivotal rotation therewith relative to the base about said second axis;
a first mirror supported by and within said base to rotate therewith about the first axis so that the reflective surface of said first mirror contains a first point of intersection of said first and second axes and so inclined so that a laser beam traveling along said first axis is deflected by said first mirror to travel along said second axis;
a second mirror supported by said arm support means within said arm to rotate therewith about the second axis so that the reflective surface of said second mirror intersects said second axis at a second point of intersection and is so inclined to direct said laser beam along said third axis of said arm;
an optical focusing assembly mounted on said arm; and
a continuous unobstructed hollow passage that extends along and surrounds said first axis to said first point of intersection and along said second axis to said second point of intersection and along said third axis to and through said optical focusing assembly; said pedestal being so disposed so that the base receives the laser beam from the laser beam generator for transmission along said hollow passage to said optical focusing assembly.

2. The system as claimed in claim 1 wherein said arm is movable linearly along the third axis relative to said arm support means.

3. The system as claimed in claim 2 wherein said arm slidably moves relative to said arm support means.

4. The system as claimed in claim 1 wherein said arm is fixed to said arm support means.

5. The system as claimed in claim 1 wherein the first axis is a vertical axis and the second axis is a horizontal axis.

6. The system as claimed in claim 1 wherein said arm is supported on said base solely by said arm support means.

7. The system as claimed in claim 1 wherein said arm support means includes a swing block.

8. The system as claimed in claim 1 further comprising first mirror support means mounted within the base for, in turn, supporting the first mirror within the base, the laser beam entering the base along the first axis.

9. The system as claimed in claim 8 wherein said first mirror support means is reversible to alternately allow the first mirror to receive the laser beam in opposite directions along the first axis.

10. The system as claimed in claim 8 or claim 9 further comprising a second mirror support means mounted on said arm support means for, in turn, supporting the second mirror within the arm.

11. The system as claimed in claim 1 wherein the base is generally cylindrical along the first axis and wherein the arm support means is laterally spaced from the corresponding cylindrical space defined by an extension of said base along the first axis during said rotary movement of said arm support means about the second axis.

12. The system as claimed in claim 8 wherein the first mirror is adjustably mounted on said first mirror support means within the base.

13. The system as claimed in claim 1 wherein said hollow passage is airtight.

14. The system as claimed in claim 1 or claim 13 wherein said hollow passage is pressurized to a positive pressure.

15. The system as claimed in claim 1 wherein said focusing assembly includes a focusing mirror to direct and focus the laser beam.

16. The system as claimed in claim 1 wherein said focusing assembly includes a focusing lens to focus the laser beam.

17. The system as claimed in claim 1 wherein the robot joins are motorized.

18. The system as claimed in claim 1 wherein said focusing assembly includes at least two rotational optical joints.

19. The system as claimed in claim 18 wherein the focusing assembly includes three rotational optical joints.

20. The system as claimed in claim 1 wherein said focusing assembly includes a forearm mounted on the robot arm.

21. The system as claimed in claim 20 wherein said focusing assembly includes a wrist assembly mounted on the forearm.

22. An industrial laser robot system comprising:
a laser beam generator for generating a laser beam;
a hollow base;
a robot arm supported on said base for rotation relative to the base about a pivot axis and elongated along an arm axis;
at least one arm mirror supported within said arm so that the reflective surface of the at least one arm mirror contains a first point of intersection of said pivot and arm axes and is so inclined so that a laser beam traveling along said pivot axis is deflected by the at least one arm mirror to travel along said arm axis;
an optical focusing assembly having first and second ends, the first end being connected to the robot arm; and
a continuous unobstructed hollow passage that extends along and surrounds said pivot axis in the base to said first point of intersection and along said arm axis to and through said optical focusing assembly; said base being so disposed so that the base receives the laser beam from the laser beam generator for transmission along said hollow passage and out of the focusing assembly at the second end of the focusing assembly; and wherein the improvement comprises:
maintaining means for automatically maintaining a positive pressure within an acceptable range above atmospheric pressure in the hollow passage, said hollow passage being substantially air-tight and wherein the positive pressure prevents contaminants from entering said hollow passage.

23. The system as claimed in claim 22 wherein the focusing assembly includes a hollow wrist mechanism supported on the robot arm for movement relative to a wrist axis.

24. The system as claimed in claim 23 further comprising at least one wrist mirror supported within said wrist mechanism so that the reflective surface of the at least one wrist mirror intersects said arm axis at a second point of intersection and is so inclined to direct the laser beam along said wrist axis, said hollow passage extending along the arm axis to said second point of intersection, along said wrist axis and through the wrist mechanism.

25. The system as claimed in claim 22 or claim 23 or claim 24 further comprising a pedestal having a pedestal axis and wherein the base is supported on said pedestal for rotation about the pedestal axis.

26. The system as claimed in claim 25 further comprising a base mirror supported within said base so that the reflective surface of the base mirror contains a point of intersection of the pedestal axis and the pivot axis and is so inclined so that a laser beam traveling along the pedestal axis is deflected by the base mirror to travel along the pivot axis, said hollow passage extending along the pedestal axis to the point of intersection of the pedestal axis and the pivot axis and along the pivot axis to the first point of intersection.

27. The system as claimed in claim 22 wherein said maintaining means includes a conduit supported within the robot arm between the arm mirror and the octical focusing assembly.

28. The system as claimed in claim 27 wherein said arm is movable linearly along the arm axis relative to the base and wherein said conduit is movable between expanded and contracted positions in response to said linear arm movement.

29. The system as claimed in claim 22 wherein the base forms a portion of the hollow passage and wherein said maintaining means includes an air source in fluid communication with the interior of the hollow base for pressurizing the hollow passage.

30. The system as claimed in claim 22 or claim 29 further comprising a transparent optical element supported at the second end of the focusing assembly for sealing the hollow passage, the laser beam passing through the optical element.

31. The system as claimed in claim 30 wherein the optical element is a transparent plate.

32. The system as claimed in claim 30 wherein the optical element is a focusing lens.

33. The system as claimed in claim 29 further comprising a drive system to drive the robot arm and a computer-based controller for sequentially controlling the drive system, the laser beam generator and said air source.

34. The system as claimed in claim 33 wherein the drive system includes at least one servo motor.

35. An industrial laser robot for use in an industrial laser robot system having a laser beam generator for generating a laser beam, the robot comprising:
a pedestal having a first axis;
a hollow base supported on said pedestal for rotation about said first axis;
hollow arm support means supported on said base for rotation relative to the base about a second axis, said first and second axes being obliquely angled to and intersecting one another;
a robot arm elongated along a third axis and supported on said arm support means for pivotal rotation therewith relative to the base about said second axis;
a first mirror supported within said base so that the reflective surface of said first mirror contains a first point of intersection of said first and second axis and so inclined so that a laser beam traveling along said first axis is deflected by said first mirror to travel along said second axis;
a second mirror supported by said arm support means within said arm so that the reflective surface of said second mirror intersects said second axis at a second point of intersection and is so inclined to direct said laser beam along said third axis of said arm;
an optical focusing assembly mounted on said arm; and
a continuous unobstructed hollow passage that extends along and surrounds said first axis to said first point of intersection and along said second axis to said second point of intersection and along said third axis to and through said optical focusing assembly; said pedestal being so disposed so that the base receives the laser beam from the laser beam generator for transmission along said hollow passage to said optical focusing assembly wherein said hollow passage is airtight.

36. The robot as claimed in claim 35 wherein said hollow passage is pressurized to a positive pressure.

37. An industrial laser robot for use in an industrial laser robot system having a laser beam generator for generating a laser having a robot comprising:
- a pedestal having a first axis;
- a hollow base supported on said pedestal for rotation about said first axis;
- hollow arm support means supported on said base for rotation relative to the base about a second axis, said first and second axes being obliquely angled to and intersecting one another;
- a robot arm elongated along a third axis and laterally supported on said arm support means for pivotal rotation therewith relative to the base about said second axis;
- a first mirror supported within said base so that the reflective surface of said first mirror contains a first point of intersection of said first and second axis and so inclined so that a laser beam traveling along said first axis is deflected by said first mirror to travel along said second axis;
- a second mirror supported by said arm support means within said arm so that the reflective surface of said second mirror intersects said second axis at a second point of intersection and is so inclined to direct said laser beam along said third axis of said arm;
- an optical focusing assembly mounted on said arm; and
- a continuous unobstructed hollow passage that extends along and surrounds said first axis to said first point of intersection and along said second axis to said second point of intersection and along said third axis to and through said optical focusing assembly; said pedestal being so disposed so that the base receives the laser beam from the laser beam generator for transmission along said hollow passage to said optical focusing assembly wherein said hollow passage is pressurized to a positive pressure.

* * * * *